US012608422B2

(12) United States Patent
Ghazi et al.

(10) Patent No.: US 12,608,422 B2
(45) Date of Patent: Apr. 21, 2026

(54) VIDEO MANAGEMENT SYSTEM AND METHOD FOR AUDIO EVENT SEARCH AND CLASSIFICATION

(71) Applicant: Robert Bosch GmbH, Stuttgart (DE)

(72) Inventors: Irtsam Ghazi, Pittsburgh, PA (US);
Ho-Hsiang Wu, Morrisville, NC (US);
Ajit Belsarkar, Lancaster, PA (US);
Luca Bondi, Pittsburgh, PA (US);
Wei-Cheng Lin, Pittsburgh, PA (US);
Samarjit Das, Wexford, PA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/782,591

(22) Filed: Jul. 24, 2024

(65) Prior Publication Data

US 2026/0030294 A1      Jan. 29, 2026

(51) Int. Cl.
*G06F 16/78*          (2019.01)
*G06F 16/738*        (2019.01)
*G06F 16/783*        (2019.01)

(52) U.S. Cl.
CPC ........ *G06F 16/7834* (2019.01); *G06F 16/738* (2019.01)

(58) Field of Classification Search
USPC ........................................................ 386/241
See application file for complete search history.

(56) References Cited

U.S. PATENT DOCUMENTS

| | | | | |
|---|---|---|---|---|
| 8,521,737 | B2 * | 8/2013 | Hart ...................... | G06F 16/583 |
| | | | | 707/758 |
| 8,768,945 | B2 * | 7/2014 | Sathya ................... | G06V 20/49 |
| | | | | 707/758 |
| 8,775,177 | B1 * | 7/2014 | Heigold .................. | G10L 15/10 |
| | | | | 704/270.1 |
| 9,208,225 | B1 * | 12/2015 | Sharifi ................... | G06Q 10/10 |
| 9,986,394 | B1 * | 5/2018 | Taylor .................... | H04W 4/18 |
| 10,762,903 | B1 * | 9/2020 | Kahan .................... | G10L 15/26 |
| 10,887,764 | B1 * | 1/2021 | Mokady .................. | H04W 4/14 |

(Continued)

OTHER PUBLICATIONS

Koepke A Sophia et al: "Audio Retrieval With Natural Language Queries: A Benchmark Study",IEEE Transactions On Multimedia, IEEE, USA, vol. 25, Feb. 7, 2022 (Feb. 7, 2022), pp. 2675-2685, XP011944904, ISSN: 1520-9210, DOI: 10.1109/TMM.2022.3149712 [retrieved on Feb. 8, 2022].

(Continued)

*Primary Examiner* — Nigar Chowdhury
(74) *Attorney, Agent, or Firm* — Brooks Kushman, P.C.

(57)          ABSTRACT

A method includes defining, by a text encoder, a set of text embeddings for a text prompt indicative of a search query for video content having audio data indicative of a sound feature that is defined as a search parameter of the search query, and ranking a plurality of audio embeddings indicative of a plurality of audio signals and provided in a vector database using the set of text embeddings of the search query. The method further includes detecting a relevant audio record associated with an identified audio embedding from among the ranked audio embeddings, and outputting a relevant video content associated with the relevant audio record to have a computing device play the video content, the relevant video content being obtained from among a plurality of video content.

15 Claims, 4 Drawing Sheets

(56) References Cited

U.S. PATENT DOCUMENTS

| | | | | |
|---|---|---|---|---|
| 11,334,768 | B1* | 5/2022 | Brody | G06V 10/764 |
| 12,020,470 | B1* | 6/2024 | Saraee | G06F 16/951 |
| 12,198,057 | B2* | 1/2025 | Saki | H04L 67/34 |
| 2010/0306193 | A1* | 12/2010 | Pereira | G06F 16/7328 707/E17.014 |
| 2013/0347018 | A1* | 12/2013 | Limp | H04N 21/4394 725/19 |
| 2014/0009682 | A1* | 1/2014 | Cheng | G11B 27/28 348/571 |
| 2014/0095479 | A1* | 4/2014 | Chang | G06Q 30/0631 707/E17.005 |
| 2014/0368601 | A1* | 12/2014 | deCharms | H04N 7/148 348/14.02 |
| 2016/0140223 | A1* | 5/2016 | Ponting | G10L 15/063 707/749 |
| 2017/0308909 | A1* | 10/2017 | Faith | G06V 40/176 |
| 2019/0050875 | A1* | 2/2019 | McCord | G06F 40/242 |
| 2019/0163768 | A1* | 5/2019 | Gulati | G06F 16/56 |
| 2019/0220933 | A1* | 7/2019 | Papakipos | G06Q 50/01 |
| 2019/0304000 | A1* | 10/2019 | Simpson | G16B 40/00 |
| 2020/0019905 | A1* | 1/2020 | Shin | H04W 4/02 |
| 2020/0394447 | A1* | 12/2020 | Chae | G06T 7/70 |
| 2020/0410397 | A1* | 12/2020 | Chae | G06F 16/55 |
| 2021/0279269 | A1* | 9/2021 | Verma | G06F 16/24578 |
| 2021/0294840 | A1* | 9/2021 | Lee | G06N 3/084 |
| 2021/0397610 | A1* | 12/2021 | Singh | G06N 3/045 |
| 2022/0338756 | A1* | 10/2022 | Dzhekiev | G10L 25/66 |
| 2023/0074279 | A1* | 3/2023 | Spitzer-Williams | G10L 15/26 |
| 2023/0098246 | A1* | 3/2023 | Simpson | G06F 1/1632 707/703 |
| 2023/0129350 | A1* | 4/2023 | Bryan | G06F 16/632 707/705 |
| 2023/0334725 | A1* | 10/2023 | Marsden | H04W 4/024 |
| 2024/0177126 | A1* | 5/2024 | Zha | G06Q 10/1095 |
| 2024/0193913 | A1* | 6/2024 | Saraee | G06N 3/045 |
| 2024/0223839 | A1* | 7/2024 | Dean | G11B 27/031 |
| 2024/0278116 | A1* | 8/2024 | Peltier | A63F 13/52 |
| 2025/0045336 | A1* | 2/2025 | Gonsalves | G06F 16/3329 |

OTHER PUBLICATIONS

Deshmukh Soham et al: "Audio Retrieval with WavText5K and CLAP Training",Interspeech 2023, Aug. 20, 2023 (Aug. 20, 2023), pp. 2948-2952, XP093322201,DOI: 10.21437/Interspeech.2023-1136.

Elizalde Benjamin et al: "Cross Modal Audio Search and Retrieval with Joint Embeddings Based on Text and Audio",ICASSP 2019—2019 IEEE International Conference On Acoustics, Speech and Signal Processing (ICASSP), IEEE, May 12, 2019 (May 12, 2019), pp. 4095-4099, XP033565211,DOI: 10.1109/ICASSP.2019.8682632 [retrieved on Apr. 4, 2019].

Extended European Search Report in correspondence application No. EP25188770.9, dated Oct. 17, 2025, 3 pages.

* cited by examiner

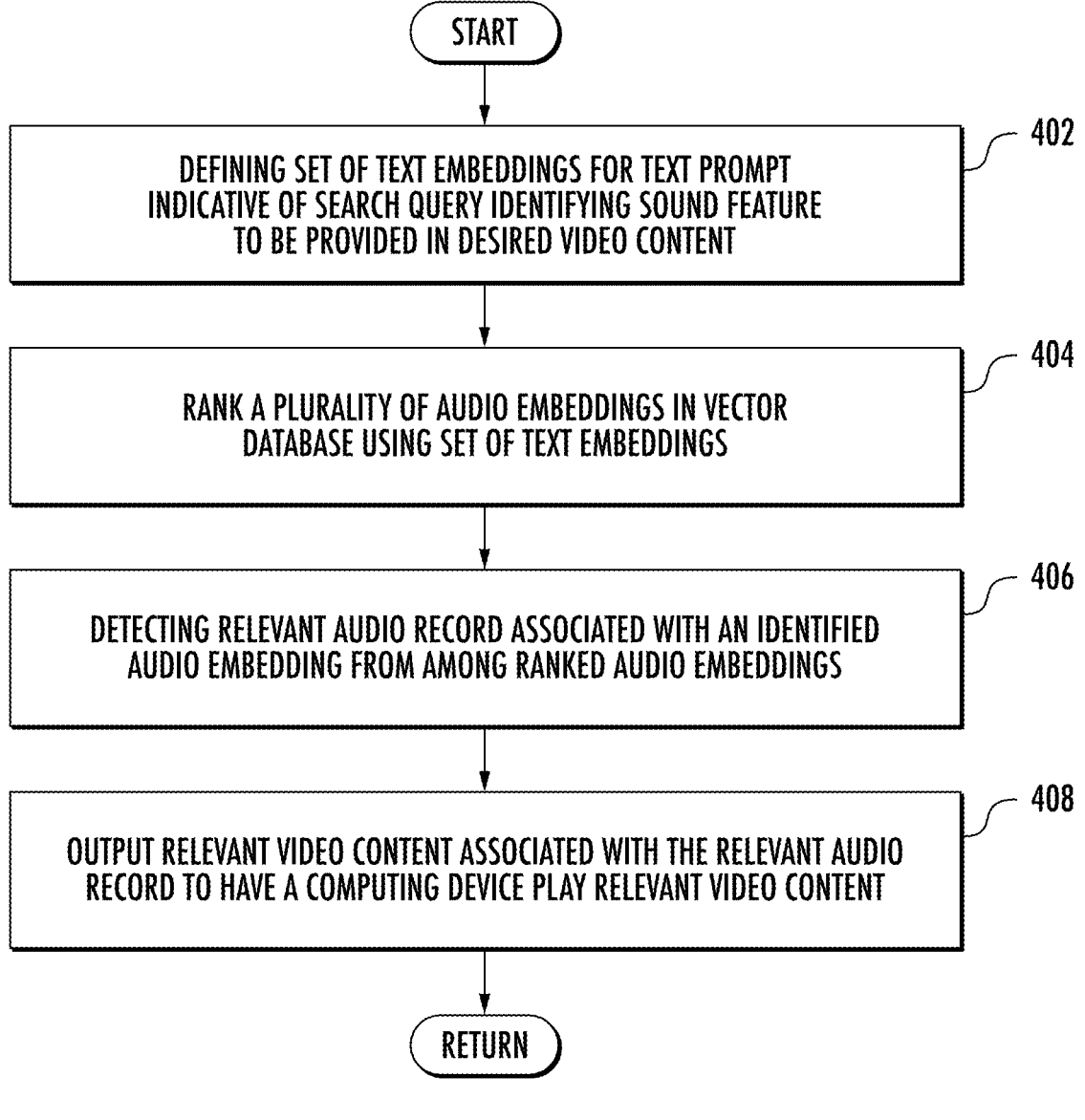

START

DEFINING SET OF TEXT EMBEDDINGS FOR TEXT PROMPT
INDICATIVE OF SEARCH QUERY IDENTIFYING SOUND FEATURE
TO BE PROVIDED IN DESIRED VIDEO CONTENT                    402

RANK A PLURALITY OF AUDIO EMBEDDINGS IN VECTOR
DATABASE USING SET OF TEXT EMBEDDINGS                      404

DETECTING RELEVANT AUDIO RECORD ASSOCIATED WITH AN IDENTIFIED
AUDIO EMBEDDING FROM AMONG RANKED AUDIO EMBEDDINGS          406

OUTPUT RELEVANT VIDEO CONTENT ASSOCIATED WITH THE RELEVANT AUDIO
RECORD TO HAVE A COMPUTING DEVICE PLAY RELEVANT VIDEO CONTENT   408

RETURN

FIG. 4

VIDEO MANAGEMENT SYSTEM AND METHOD FOR AUDIO EVENT SEARCH AND CLASSIFICATION

TECHNICAL FIELD

The present disclosure generally relates to a video management system that stores and provides access to video content generated by, for example, a camera.

BACKGROUND

From cellular phones to surveillance cameras, video content generation and storage is increasing. In a non-limiting example, surveillance cameras are routinely used to monitor areas, such as, but not limited to, recreational parks, zoos, restaurants, schools, banks, and/or shops. A video management system (VMS) can be employed to provide access to the video content by, for example, combining multiple security cameras in a display that is often operated by a person who acts on alerts as well as generally monitors the video content for possible behavior of interest from a security perspective. The VMS can also store video content from the surveillance cameras for future analysis/viewing. In addition to surveillance, the VMS can be employed in other applications, such as but not limited to, storing and managing video content generated by a person on their personal device or generated by an entertainment business that creates movies.

SUMMARY

In one form, the present disclosure is directed to a method including defining, by a text encoder, a set of text embeddings for a text prompt indicative of a search query for video content having audio data indicative of a sound feature that is defined as a search parameter of the search query, and ranking a plurality of audio embeddings indicative of a plurality of audio signals and provided in a vector database using the set of text embeddings of the search query. The method further includes detecting a relevant audio record associated with an identified audio embedding from among the ranked audio embeddings, and outputting a relevant video content associated with the relevant audio record to have a computing device play the video content, the relevant video content being obtained from among a plurality of video content.

In one form, the present disclosure is directed to a system including a vector database and one or more hardware computing devices. The one or more hardware computing devices is configured to define, by a text encoder, a set of text embeddings for a text prompt indicative of a search query for video content having audio data indicative of a sound feature that is defined as a search parameter of the search query, rank a plurality of audio embeddings indicative of a plurality of audio signals and provided in the vector database using the set of text embeddings of the search query, detect a relevant audio record associated with an identified audio embedding from among the ranked audio embeddings, and output a relevant video content associated with the relevant audio record to have a computing device play the video content, the relevant video content being obtained from among a plurality of video content.

In one form, the present disclosure is directed to a non-transitory computer-readable medium comprising instructions for a system that, when executed by one or more hardware computing devices cause the one or more hardware computing devices to perform operations including to: define, by a text encoder, a set of text embeddings for a text prompt indicative of a search query for video content having audio data indicative of a sound feature that is defined as a search parameter of the search query; rank a plurality of audio embeddings indicative of a plurality of audio signals and provided in a vector database using the set of text embeddings of the search query; detect a relevant audio record associated with an identified audio embedding from among the ranked audio embeddings; and output a relevant video content associated with the relevant audio record to have a computing device play the video content, the relevant video content being obtained from among a plurality of video content.

BRIEF DESCRIPTION OF THE DRAWINGS

FIG. 4 is a flowchart of an example video retrieval routine.

DETAILED DESCRIPTION

Figure 1:
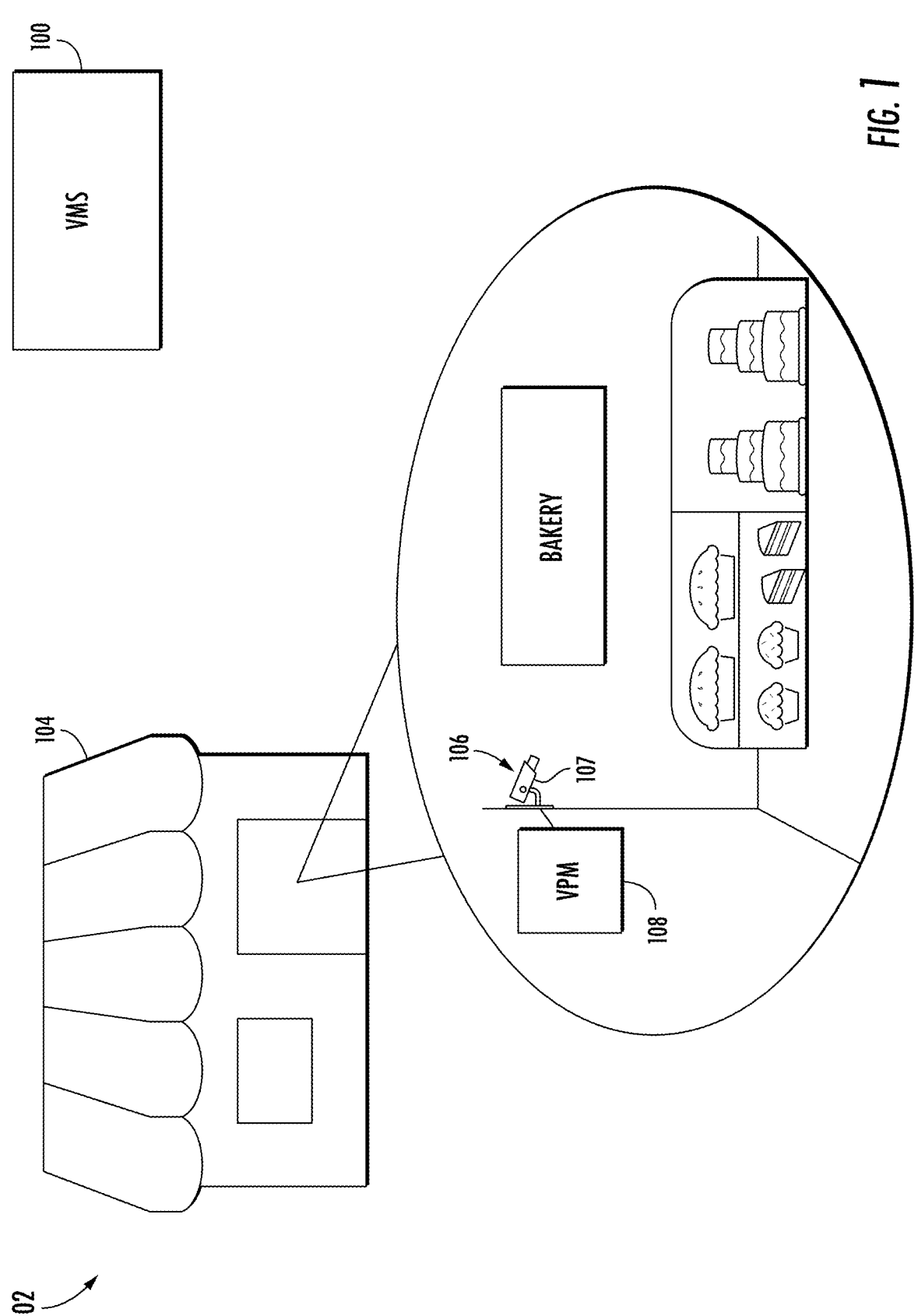
FIG. 1 illustrates a VMS as part of a surveillance system for an establishment.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

With the advent of AI enabled cameras, different industries are able to employ these AI cameras to assess multifaceted scenarios for advanced detection of behavior and/or identification of characters (e.g., people, animals, moving objects, and/or stationary objects) to holistically understand the environmental context. In some forms, audio has become a key component of performing such assessment. For example, in surveillance, audio can provide additional context to a person's reaction captured by the camera and/or provide information regarding the environment that may not be captured by the camera, such as the sound of a gunshot, glass breaking, a scream, and/or sound of a collision. However, analyzing vast amounts of video content to retrieve a relevant video based on sound may be cumbersome.

In one form, the present disclosure is directed to a system and/or method of searching a library of video content based on a sound present in the relevant video content. In a non-limiting example, the present disclosure provides an audio search operation for retrieving video content by using pretrained text-audio encoders, where an audio encoder is provided at the camera for defining audio embeddings of an audio signal being detected and a text encoder is provided at the VMS to define text embeddings of a search query. That is, in one form, the system of the present disclosure defines text embedding for a text prompt that is indicative of the search query for video content having audio data indicative of a sound feature that is defined as a search parameter of the search query. The system selects a relevant audio record associated with one or more audio embeddings ranked closely to the text embeddings defining the sound feature being searched. The system is configured to output a relevant video content associated with the relevant audio record to have a computing device play the relevant video content. Accordingly, the system of the present disclosure, as described herein, enables a user to search for video content based on audio.

Referring to FIG. 1, in an example implementation, a VMS 100 of the present disclosure is part of a surveillance system 102 for a commercial establishment 104 such as a bakery. In one form, surveillance system 102 further includes a camera system 106 having a video processing module (VPM) 108 that is configured to encode audio signals to define audio embeddings and generate video content. As described herein, the VMS 100 is configured to store the audio embeddings and the video content, and process a search query from a user to retrieve relevant video content. In one form, the search query includes one or more search parameters, such as but not limited to, a sound feature present in the video content.

In one form, the VMS 100 is a cloud-based server or an edge-based server that communicates with the camera system 106 using wireless communication and/or wired communication. In a non-limiting example, the VMS 100 and the camera system 106 communicate using cellular protocol, BLUETOOTH protocol, Wi-Fi protocol, among other wireless communication network, and includes various hardware and/or software components to support wireless communication (e.g., router, antenna, modem, computing device configured to process incoming and outgoing messages).

Figure 2:
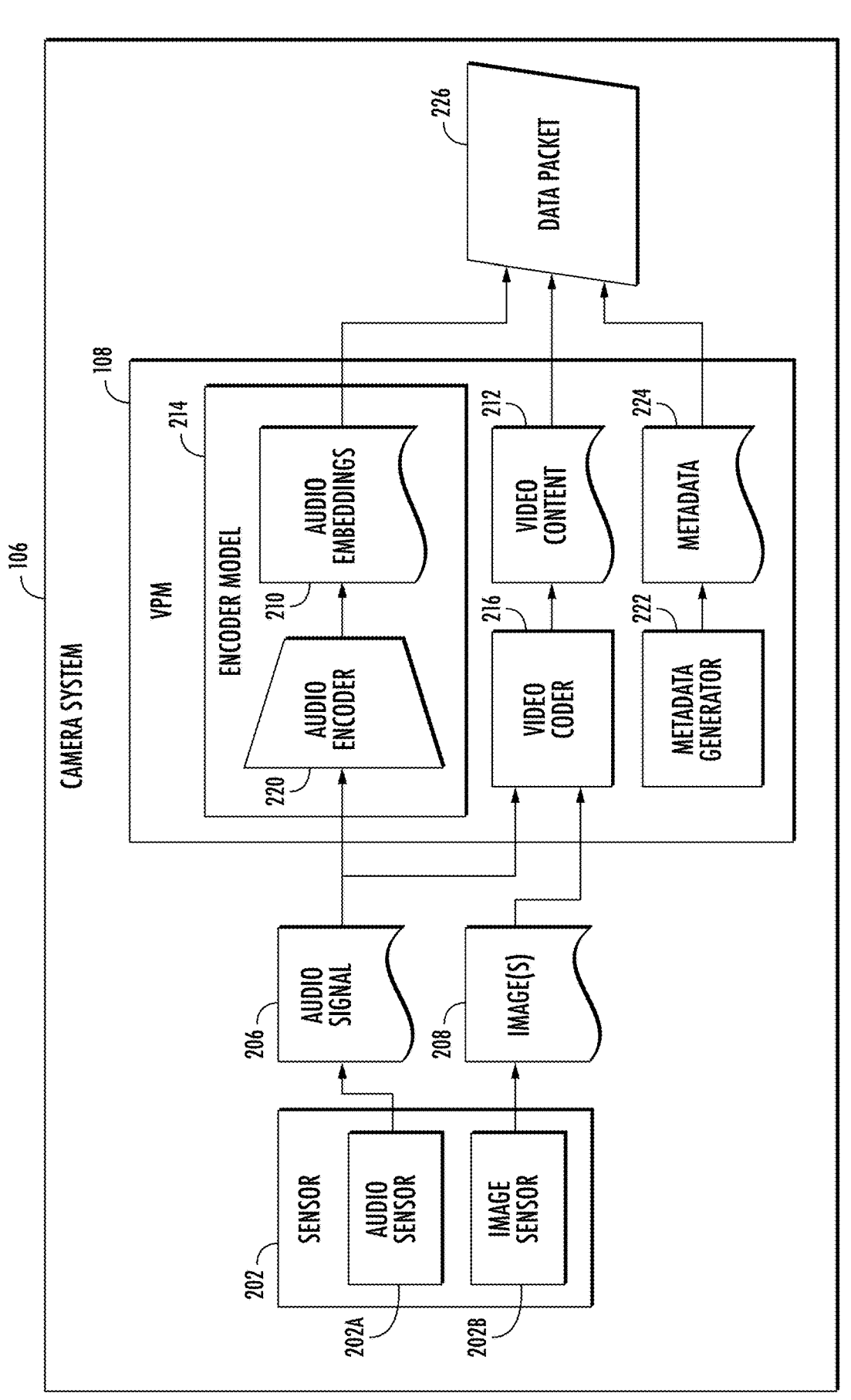
FIG. 2 is a block diagram of a camera system of the surveillance system of FIG. 1.

Referring to FIG. 2, in a non-limiting example, the camera system 106 further includes one or more sensors 202, such as an audio sensor 202A (e.g., microphone) and an imaging sensor 202B (e.g., metal oxide-semiconductor (MOS) image sensor). The audio sensor 202A is configured to detect sound in an environment (e.g., the bakery) and output an audio signal 206, which may be digital audio signal (e.g., an analog audio signal is converted to a digital audio signal using digital signal processor chip). The imaging sensor 202B is configured to generate images 208 provided in a sequence forming the visual imagery of a video.

The VPM 108 is configured to process the audio signal 206 and the images 208 to generate a set of audio embeddings 210 and video content 212. In a non-limiting example, The VPM 108 may include hardware components such as central processor, digital signal processor, memory, among other components for performing the functions provided herein. In one form, the VPM 108 includes an encoder model 214 and a video coder 216.

In one form, the encoder model 214 is provided as a pretrained audio-text encoder and includes an audio encoder 220 that is configured to encode the audio signal 206 to define the audio embeddings 210. In a non-limiting example, the encoder model 214 is a contrastive language-audio pretraining (CLAP)-type encoder, which is trained using audio-text pairs in which the text is a sentence or a single word that describes an audio sample. The audio encoder 220 of a CLAP-type encoder may be defined as a residual type neural network (e.g., ResNet 38).

The video coder 216 is configured to define the video content 212 that includes audio and visual imagery provided by the images 208. In a non-limiting example, the video coder 216 may employ a video compression technique that encodes the images along the audio signal using multimedia container format (e.g., H265 and H264).

In one form, the video processing module 204 further includes a metadata generator 222 configured to define metadata 224 to be provided with the video content 212 and/or the audio embedding 210. In a non-limiting example, the metadata 224 is provided in json format and includes: a timestamp indicative of when the video content 212 and/or audio embedding 210 was created; a camera system identification that uniquely identifies the camera system 106 that captured the audio signal 206 and the images 208; a surveillance system identification that uniquely identifies the surveillance system 102 providing the video content 212 and the audio embedding 210; and/or location information indicative of a location associated with the surveillance system 102.

The audio embeddings 210, the video content 212, and the metadata 224 is transmitted as data packets 226 using one or more different formats and/or protocols. In a non-limiting example, the data packets 226 may be transmitted using one or more techniques provided by the open network video interface forum.

While the camera system 106 is described as having specific sensors, the camera system 106 may include additional sensors such as but not limited to radar and infrared. In another example, the camera system 106 is configured to include machine learning algorithms to improve operation of the VPM 108. In addition, while one camera system 106 is provided, multiple camera systems 106 may be used as part of the surveillance system 102. In one form, each camera system 106 is configured to communicate with the VMS 100. Alternatively, a central system may be provided to communicate with each of the camera systems 106 using, for example, a local network, and the central camera system is configured to communicate with the VMS 100.

Figure 3:
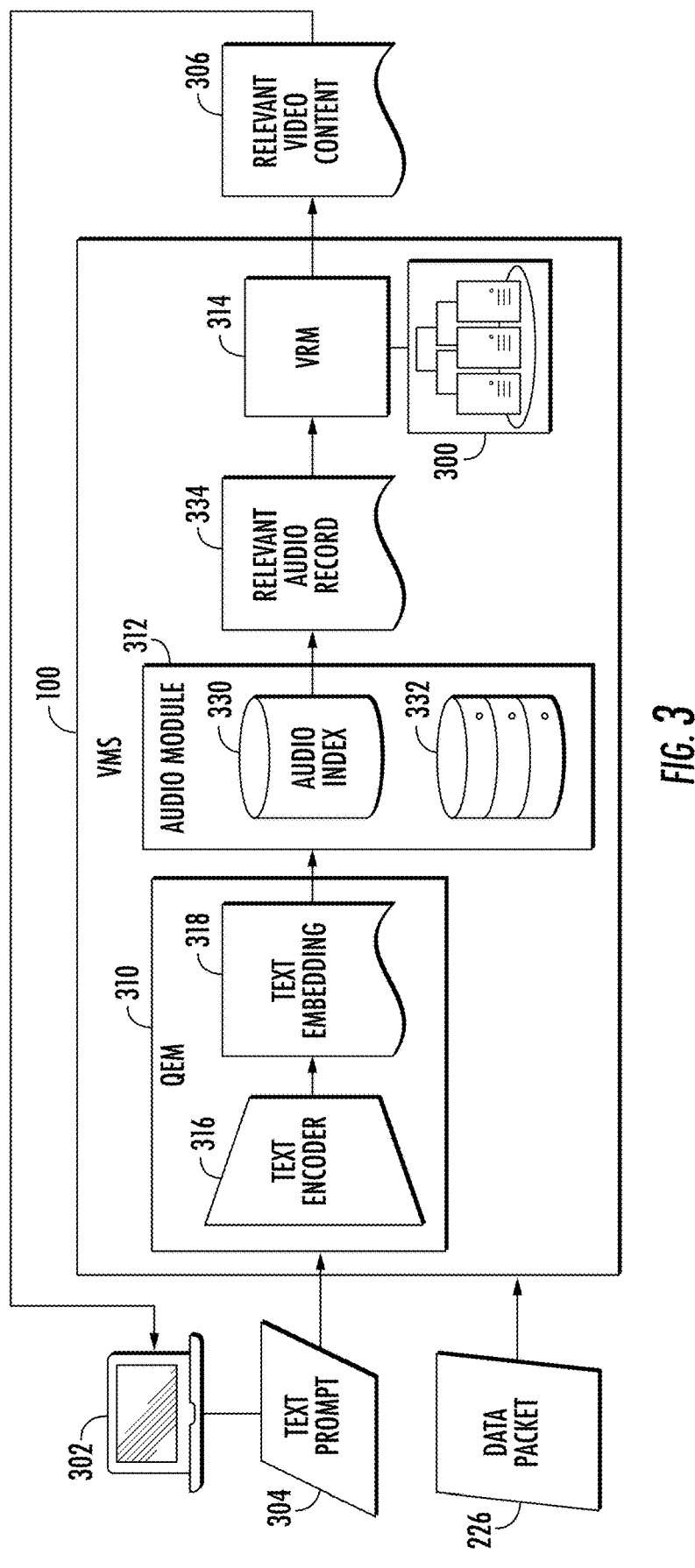
FIG. 3 is a block diagram of the VMS of FIG. 1.

The VMS 100 is configured to store the audio embedding 210 and the video content 212 from the camera system 106, and obtain a search query from a user to search for relevant video content. Referring to FIG. 3, the VMS 100 is configured to search a video catalog library 300 based on a description of a sound feature to be provided in the video content 212. In a non-limiting example, a user may communicate with the VMS 100 using a computing device 302 via one or more web-based graphical interfaces supported by the VMS 100. The VMS 100 may provide a graphical interface in which the user is able to provide a text prompt 304 having one or more words to define a search query. The search query, as the text prompt 304, provides one or more search parameters for a relevant video content 306 and includes terms describing a sound feature captured in the video content being sought. In a non-limiting example, the VMS 100 employs server-client architecture to communicate with the computing devices 302 and/or the camera system 106.

In addition to the sound feature, the search parameters may also include information for identifying the relevant video content, such as but not limited to information indicative of: the location of where the sound feature originated (e.g., location of the surveillance system 102); one or more dates indicating when the sound feature was recorded; or one or more identifiers of a video system that recorded the sound feature (e.g., identification of the camera system and/or the surveillance system). In a non-limiting example, the search query may include: "broken glass"; "falling tree at 123 Lincoln Dr."; "door slamming"; and/or "explosion at bakery in May 2023."

In one form, the VMS 100 includes a query encoding module (QEM) 310, an audio module 312, and a video retrieval module (VRM) 314. The QEM 310 includes a text encoder 316 configured to process the text prompt to define a set of text embedding 318 (e.g., query embeddings). In a non-limiting example, the text encoder 316 is provided as a pretrained encoder audio-text encoders like a CLAP text encoder.

In one form, the audio module 312 is configured to include an audio index 330 and an audio information database 332. The audio index 330 includes a vector database that associates text embedding and audio embedding, and the audio information database 332 is configured to store data or audio records that associates the audio embeddings of the audio index 330 with associated video content stored in the video catalog library 300.

In a non-limiting example, in receiving the audio embeddings 210 from the camera system 106, the audio module 312 is configured to store the embedding 210 in the audio index 330 as searchable indices and associate the embeddings 210 with the video content 212 by defining correlation information or an audio record using data provided as part of the metadata 224 and storing the same in audio information database 332 (e.g., timestamp may be provided as correlation information or audio record to associate the audio embedding with respective video content).

The audio module 312 is further configured to process the text embedding 316 to obtain a relevant audio record 334 from the audio information database 332, where the relevant audio record 334 is used to obtain the relevant video content 306. For example, the audio index 320 is configured to compute a distance between audio embedding (e.g., search indices) in the vector database from the text embeddings 318 of the search query. The audio index 320 is configured to compare the distance among the audio embeddings and obtain relevant indices, which are associated with one or more audio embeddings having the shortest distance or, stated differently, having a top ranking. For example, the audio index 320 is configured to identify the first X-number of audio embeddings (e.g., top 3 audio embeddings or just the first ranked audio embedding). The top ranked embeddings are used to retrieve relevant audio record 334 and identify the relevant video content 306 having the audio signal associated with the top ranked embedding. In some form, the audio module 312 is configured to employ time ranges or time limits such as a date range to mitigate delays that can be associated with searching a large database.

The VRM 314 is configured to manage the video catalog library 300 and retrieve the relevant video content 306 based on the relevant audio record 334. In a non-limiting example, the video catalog library 300 includes rack mount servers that store large amount of data (e.g., 32TB). The VRM 314 is configured to store the video content 212 from the camera system 106 in the video catalog library 300 based on, at least, the metadata 224 (e.g., based on timestamp, location of the camera system or establishment; identification of the camera system; and/or identification of the surveillance system 102).

In one form, in retrieving the relevant video content 306, the VRM 314 uses the relevant audio data 334 associated with the audio embedding that ranked highest with the text embedding 318. In a non-limiting example, the relevant audio record 334 includes at least a portion of the metadata 224 that is employed to organize the video content stored in the video catalog library 300, and the VRM 314 is able to identify the relevant video content 306 based on the metadata 224. The relevant video content 306 is then outputted to the computing device 302 for viewing on a display and heard through speakers of the computing device 302.

With the VMS 100 and the camera system 106, a user is able to search a large library of video content (e.g., the video catalog library 300) by describing a sound feature in the search query. The pretrained audio-text encoders are configured to encode audio signals and process text prompts to search for an identified audio signal detected providing an advanced searchable video system. In one form, in addition to historical video content, the VMS 100 is configured to search audio embeddings provided in real-time from the camera system 106.

Referring to FIG. 4, an example video retrieval routine 400 performed by the VMS 100 is provided.

At operation 402, the VMS 100 is configured to define a set of text embeddings for a text prompt indicative of a search query. The search query is for retrieving video content having audio data indicative of a sound feature that is defined as a search parameter in the search query. In a non-limiting example, the text prompt is encoded using a text encoder using a CLAP-type encoder.

At operation 404, the VMS 100 ranks a plurality of audio embeddings indicative of a plurality of audio signals and provided in a vector database using the set of text embeddings. In a non-limiting example, the audio index 330 is configured to rank the audio embeddings based on distance between the audio embedding and the set of text embeddings, and those audio embeddings having shorter distance are ranked higher than those audio embeddings having longer distances.

At operation 406, the VMS 100 is configured to detect a relevant audio record associated with an identified audio embedding from among ranked audio embeddings. In a non-limiting example, the relevant audio record is provided as data used to associate the audio embedding with a respective video content, and the data may be stored with the audio embedding and/or is stored in database as part of an audio record.

At operation 408, the VMS 100 is configured to output a relevant video content associated with the relevant audio record to have a computing device play the relevant video content. In a non-limiting example, the VMS 100 is configured to obtain the relevant video content from among a plurality of video content stored in the video catalog library 300 using the data in the relevant audio record. In response to receiving the relevant video content, the computing device may play the video content having the sound feature provided in the search query.

In one form, the VMS 100 is configured to further train the audio encoder 214 and the text encoder 316 to incorporate additional audio classification that may not have been part of the original training. In a non-limiting example, the VMS 100 employs zero-shot classification to add audio classifications by having the VMS 100 provide text embeddings for a desired classification to the text encoder 316 and the audio encoder 214. The audio encoder 214 continues to encode audio signal to define audio embeddings, and the audio embeddings along with the text embeddings for the desired classification are used to compute cosine loss and the class probability which is provided to the VMS 100 as metadata for further processing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

In a non-limiting example, the camera system 106 and/or the VMS 100 may include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory or memory circuit may be a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are non-volatile memory circuits (such as a flash memory circuit, an erasable programmable read-only memory circuit, or a mask read only circuit), volatile memory circuits (such as a static random access memory circuit or a dynamic random access memory circuit), magnetic storage media (e.g., an analog or digital magnetic tape or a hard disk drive), and optical storage media (e.g., a USB, CD, a DVD, or a Blu-ray Disc).

The camera system 106 and/or the VMS 100 described in this application may be partially or fully implemented by a special purpose computer created by configuring a general-purpose computer to execute one or more particular functions embodied in computer programs. Components employed for the camera system 106 and/or the VMS 100 may be provided in a single device or may be distributed among multiple devices that are in communication using wireless communication (e.g., cellular network, WiFi network, BLUETOOTH, among others) and/or wired communication.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:
   defining, by an audio encoder of a camera system, a set of audio embeddings for a detected audio signal obtained in conjunction with images provided in a video content generated by the camera system;
   storing the set of audio embeddings of the detected audio signal to a vector database and the video content in a video catalog library;

defining, by a text encoder, a set of text embeddings for a text prompt indicative of a search query for a desired video content having audio data indicative of a sound feature that is defined as a search parameter of the search query;
   ranking a plurality of audio embeddings indicative of a plurality of audio signals and provided in the vector database using the set of text embeddings of the search query;
   detecting a relevant audio record associated with an identified audio embedding from among the ranked audio embeddings; and
   outputting a relevant video content associated with the relevant audio record to have a computing device play the relevant video content, the relevant video content being obtained from among a plurality of video content stored in the video catalog library.

2. The method of claim 1, further comprising retrieving the relevant video content based on correlation data provided with the relevant audio record and including at least one of a timestamp, a location at which the relevant video content was captured, or an identification associated with the camera system that created the relevant video content.

3. The method of claim 1, further comprising defining data to associate the set of audio embeddings with the video content generated using metadata provided with the set of audio embeddings and the video content generated.

4. The method of claim 1, wherein the audio encoder and the text encoder define the set of audio embeddings and the set of text embeddings with a contrastive language-audio pretraining technique, respectively.

5. The method of claim 1, wherein the search parameter of the search query includes information indicative of, at least one of, a location of where the sound feature originated, one or more dates indicating when the sound feature was obtained, or identifier of the camera system that recorded the sound feature.

6. A system comprising:
   a vector database; and
   one or more hardware computing devices configured to:
      define, by an audio encoder, a set of audio embeddings for an audio signal detected and obtained in conjunction with images provided in a video content generated by a camera system;
      store the set of audio embeddings of the detected audio signal to the vector database and the video content in a video catalog library;
      define, by a text encoder, a set of text embeddings for a text prompt indicative of a search query for a desired video content having audio data indicative of a sound feature that is defined as a search parameter of the search query;
      rank a plurality of audio embeddings indicative of a plurality of audio signals and provided in the vector database using the set of text embeddings of the search query;
      detect a relevant audio record associated with an identified audio embedding from among the ranked audio embeddings; and
      output a relevant video content associated with the relevant audio record to have a computing device play the relevant video content, the relevant video content being obtained from among a plurality of video content stored in the video catalog library.

7. The system of claim 6, wherein the one or more hardware computing devices are further configured to retrieve the video content from the video catalog library storing the plurality of video content based on correlation data provided with the relevant audio record and including at least one of a timestamp, a location at which the video content was captured, or an identification associated with a camera system that created the video content.

8. The system of claim 6, further comprising defining data to associate the set of audio embeddings stored in the vector database with the video content stored in the video catalog library.

9. The system of claim 6, wherein the audio encoder and the text encoder defining the set of audio embeddings and the set of text embeddings are a contrastive language-audio pretraining type of encoders, respectively.

10. The system of claim 6, wherein the search parameter of the search query includes information indicative of at least one of a location of where the sound feature originated, one or more dates indicating when the sound feature was obtained, or an identifier of a camera system that recorded the sound feature.

11. A non-transitory computer-readable medium comprising instructions for a system that, when executed by one or more hardware computing devices cause the one or more hardware computing devices to perform operations including to:

define, by an audio encoder, a set of audio embeddings for an audio signal provided in a video content generated by a camera system;

store the set of audio embeddings of the audio signal provided to a vector database and the video content generated in a video catalog library;

define, by a text encoder, a set of text embeddings for a text prompt indicative of a search query for a desired video content having audio data indicative of a sound feature that is defined as a search parameter of the search query;

rank a plurality of audio embeddings indicative of a plurality of audio signals provided in the vector database using the set of text embeddings of the search query;

detect a relevant audio record associated with an identified audio embedding from among the ranked audio embeddings; and output a relevant video content associated with the relevant audio record to have a computing device play the relevant video content, the relevant video content being obtained from the video catalog library.

12. The non-transitory computer-readable medium of claim 11, wherein the instructions further cause the one or more hardware computing devices to perform operations including to retrieve the relevant video content from the video catalog library storing a plurality of video content based on correlation data provided with the relevant audio record and including at least one of a timestamp, a location at which the video content was captured, or an identification associated with a camera system that created the video content.

13. The non-transitory computer-readable medium of claim 11, wherein the audio encoder and the text encoder defining the set of audio embeddings and the set of text embeddings are a contrastive language-audio pretraining type of encoders, respectively.

14. The non-transitory computer-readable medium of claim 11, wherein the instructions further cause the one or more hardware computing devices to perform operations including to define data to associate the set of audio embeddings stored in the vector database with the video content stored in the video catalog library.

15. The non-transitory computer-readable medium of claim 11, wherein the search parameters of the search query further include information indicative of a location of where the sound feature originated, one or more dates indicating when the sound feature was obtained, or an identifier of a camera system that recorded the sound feature.

\* \* \* \* \*